US009776345B2

(12) United States Patent
Orsi Mazzucchelli et al.

(10) Patent No.: US 9,776,345 B2
(45) Date of Patent: Oct. 3, 2017

(54) MANUFACTURING PROCESS OF A PRODUCT BASED ON CELLULOSE ACETATE WITH BLENDED COLOUR

(71) Applicants:Davide Orsi Mazzucchelli, Castiglione Olona (IT); Elena Orsi Mazzucchelli, Castiglione Olona (IT)

(72) Inventors: Davide Orsi Mazzucchelli, Castiglione Olona (IT); Elena Orsi Mazzucchelli, Castiglione Olona (IT)

(73) Assignee: MAZZUCCHELLI 1849 S.P.A., Castiglione Olona (IT)

( * ) Notice: Subject to any disclaimer, the term of this patent is extended or adjusted under 35 U.S.C. 154(b) by 418 days.

(21) Appl. No.: 14/495,938

(22) Filed: Sep. 25, 2014

(65) Prior Publication Data

US 2015/0085242 A1 Mar. 26, 2015

(30) Foreign Application Priority Data

Sep. 25, 2013 (IT) .............................. MI2013A1582

(51) Int. Cl.
*B29C 43/20* (2006.01)
*B29B 11/12* (2006.01)
(Continued)

(52) U.S. Cl.
CPC ............ *B29C 43/206* (2013.01); *B29B 11/02* (2013.01); *B29B 11/10* (2013.01); *B29B 11/12* (2013.01);
(Continued)

(58) Field of Classification Search
CPC ......... B29B 11/02; B29B 11/12; B29C 43/20; B29C 43/206; B29D 12/02
See application file for complete search history.

(56) References Cited

U.S. PATENT DOCUMENTS

| 1,557,780 | A | * | 10/1925 | Schumacher | ............ | G02C 5/00 |
| | | | | | | 16/228 |
| 1,637,029 | A | * | 7/1927 | Schumacher | .......... | B29D 12/02 |
| | | | | | | 351/154 |

(Continued)

FOREIGN PATENT DOCUMENTS

| EP | 267409 | 5/1988 |
| FR | 2 637 532 | 4/1990 |

(Continued)

OTHER PUBLICATIONS

IT Search Report dated Jul. 8, 2014, corresponding to the Foreign Priority Application No. MI2013A001582.

*Primary Examiner* — Benjamin Schiffman
(74) *Attorney, Agent, or Firm* — Young & Thompson

(57) ABSTRACT

A manufacturing process and the semi-finished product of thermoplastic material obtained therefrom, for obtaining products with aesthetic patterns which can be perceived in semitransparency also in depth is disclosed. The process includes: (i) producing at least two initial elements of thermoplastic material with even but different aesthetic patterns, having a different concentration of the dominating coloring, at least the dominating coloring being of the bleeding type in the specific thermoplastic material; (ii) shaping the two initial elements into strips or loaves being of a submultiple width, not below ⅕ of a characteristic dimension of the desired finished product; (iii) inserting at least two of the strips or loaves having different concentration of the dominating coloring, into a workform, arranging them side by side according to a direction of side-by-side arrangement; and (iv) undergoing pressure and heat to allow the melting and hardening of the thermoplastic material into a single body.

11 Claims, 2 Drawing Sheets

(51) Int. Cl.
*B29B 11/02* (2006.01)
*B29B 11/10* (2006.01)
*B29C 47/00* (2006.01)
*B29C 47/04* (2006.01)
*G02C 5/00* (2006.01)
*B29D 12/02* (2006.01)
*B29K 1/00* (2006.01)
*B29K 105/00* (2006.01)
*B29L 12/00* (2006.01)

(52) U.S. Cl.
CPC ............ *B29C 43/20* (2013.01); *B29C 43/203* (2013.01); *B29C 47/0004* (2013.01); *B29C 47/0066* (2013.01); *B29C 47/046* (2013.01); *B29D 12/02* (2013.01); *G02C 5/008* (2013.01); *B29C 2793/009* (2013.01); *B29K 2001/12* (2013.01); *B29K 2105/0032* (2013.01); *B29K 2995/002* (2013.01); *B29L 2012/005* (2013.01); *G02C 2200/12* (2013.01); *G02C 2200/14* (2013.01); *Y10T 428/24769* (2015.01)

(56) References Cited

U.S. PATENT DOCUMENTS

| | | | | |
|---|---|---|---|---|
| 1,825,427 A * | 9/1931 | Siddall | ............ | G02C 5/00 156/303.1 |
| 2,677,634 A | 5/1954 | Collier, Jr. | | |
| 2,985,556 A | 5/1961 | Rowland | | |
| 3,288,666 A | 11/1966 | Dacey | | |
| 3,471,609 A * | 10/1969 | Belanger | ............ | B29C 45/14 264/267 |
| 3,513,060 A | 5/1970 | Krystof | | |
| 3,531,828 A * | 10/1970 | Nauta | ............ | B29C 47/043 264/75 |
| 3,549,248 A * | 12/1970 | Schuler | ............ | B29D 12/02 351/154 |
| 3,753,825 A * | 8/1973 | Stock | ............ | B29D 12/02 156/277 |
| 4,013,747 A * | 3/1977 | Hampel | ............ | B29B 13/00 264/234 |
| 4,190,480 A * | 2/1980 | Ebert | ............ | B29D 12/02 156/193 |
| 5,786,881 A * | 7/1998 | Monroe | ............ | B29D 12/02 351/41 |
| 9,448,419 B2 * | 9/2016 | Balzan | ............ | G02C 5/006 |
| 2013/0169921 A1 * | 7/2013 | Orsi Mazzucchelli | | B29D 12/02 351/41 |
| 2015/0013871 A1 * | 1/2015 | McEwen | ............ | B29C 43/58 152/525 |
| 2015/0131046 A1 * | 5/2015 | Balzan | ............ | G02C 5/006 351/41 |
| 2017/0106610 A1 * | 4/2017 | Manera | ............ | B29D 12/02 |

FOREIGN PATENT DOCUMENTS

FR 2 907 713 5/2008
GB 1 124 254 8/1968

* cited by examiner

MANUFACTURING PROCESS OF A PRODUCT BASED ON CELLULOSE ACETATE WITH BLENDED COLOUR

FIELD OF THE INVENTION

The present invention relates to a manufacturing process of a sheet of thermoplastic material based on cellulose esters, polyesters and co-polyesters. In particular, it relates to such a process for obtaining a sheet of plastic material with a blended, gradation colour (specifically for use in the eyewear industry, fashion jewelry industry, and in products characterised by refined appeal) and to the product which can be obtained from such sheet.

BACKGROUND ART

Cellulose esters have been used since their discovery for manufacturing products with a strong aesthetic appeal. Among them, a material particularly widespread in the eyewear and fashion jewelery industry is cellulose acetate.

The strengths of said polymers are thermoplasticity, transparency, colourability, malleability, as well as the physical-mechanical features which make them suitable in the eyewear industry, optical industry, fashion jewelery industry and more recently in the industry of technological instruments.

Typically, this material is supplied to product manufacturers in the shape of semi-processed sheets, which already have their characteristic colour (with varied patterns which are perceived in transparency in the sheet depth) and which are subsequently simply cut to obtain the final products (for example a glasses frame).

The processes known for obtaining the sheet are, among others, the wet block process (for example the material manufactured under the trade names XELOX®, XELOX-S®, RHODOID® or M49® available from the same applicant), extrusion and co-extrusion (for example the material manufactured under the commercial names XELOX-T®, OPTIROID® available from the same applicant), the dry block process (for example the material manufactured under the commercial names CEBLOX® or TECBLOCK® available from the same applicant), injection and co-injection. Through typical processing it is possible to impart to such sheets a strong aesthetic appeal, by melting powders (enriched with plasticisers and solvents), granules, semi-finished products of various shapes and thicknesses among which also the sheets.

Historically, the first aesthetic effects which were imparted to the sheets were the ones borrowed from nature. As a matter of fact, through the processing of cellulose esters it was possible to obtain synthetic copies of animal-origin raw materials such as horn, tortoise-shell, bone, but also wood.

A block processing, which allows to obtain these aesthetic effects, is disclosed in EP267409, owned by the same applicant. The technique disclosed in this patent has been widely used over the years with great effectiveness and satisfaction. It provides to evenly and randomly mix, although with varying relative amounts, two different types of basic granular elements (such as granules, powders, dice, fragments, . . . ) and then subjecting them to pressure and heat, so that they become inextricably bonded, creating an effect of generalised diffusion of the dark colouring towards the lighter material part.

However, this technique allows to obtain substantially even sheets, that is, with an evenly distributed minute design (with geometric evenness or randomly) across the sheet. That does hence not allow to obtain, within the same sheet, a blurred colour hue or other more marked colour changes between predetermined different areas of the sheet.

In many circumstances the market requires instead sheets which allow to obtain blurred effects between one colour and another, in geometrically predefined areas. For example, in the eyewear industry, it is desired to be able to offer eyeglasses in which the frontpiece has a darker colour pattern in the upper part and a lighter colour pattern in the lower part (or vice versa) or a darker colour pattern on the two sides and lighter in the central area (or vice versa), wherein there is a certain continuity between the different patterns.

In this context, by "pattern" any layout of one or more colours is understood, which defines, in its relevance area, an even aesthetic appearance, for example a single-colour, or a so-called "Havana" or even a diced/chequered effect, a horn effect, other geometric/fancy patterns and so on.

So far, in order to be able to obtain differently-coloured sheets, one can proceed in two different ways: through special extrusion techniques (see, for example, documents U.S. Pat. No. 2,985,556 and U.S. Pat. No. 3,513,060 where extrusion processes are detailed, while also U.S. Pat. No. 3,288,666 discloses an example of how the extruded sheet with a coloured wedge find an application) or with gluing/thermal or chemical welds of different semi-finished products.

As can be guessed, both these techniques are not fully satisfactory, both because they are complex, and because they do not allow to obtain a perfect blending effect between one pattern and the other. As a matter of fact, between one pattern and the other more or less dividing lines nevertheless remain (especially in the case of gluing) which may not be aesthetically appealing. The joining lines sometimes originate also actual local deformations (due to differentiated shrinkage of the materials or to the discontinuity caused by the joining means).

In the semi-finished products obtained by these known-art solutions, some effects are precluded (for example, with the extrusion and injection methods some spots cannot be produced; by contrast, with the standard block methods, obtaining wedges or inserts would imply additional processing, with the uncertainty of the final effect), while others are extremely labour-intensive or costly. Moreover, in the sheet from which eyeglasses (or other products) are obtained or in the roughly-shaped blocks for eyeglasses (or other finished product), the gluing/joining area gives origin to some flaws as well as making the finished product more fragile. In some cases the gluing or the joining may be visible, creating rifling effects or effects of aesthetic flaws, said flaws being due to the dissimilar dimensional behaviour of the mutually joined various components. In order to overcome these flaws, it has been proposed to resort to the welding of different sheets along inclined surfaces, according to planes inclined by few degrees (below 30°) with respect to the observation surface of the sheets. That allows to obtain a blurred colour effect, exploiting the semi-clearness of the material which, in the direction of sheet depth, causes a sensation of blurring. However, these techniques are not fully satisfactory either.

It must furthermore be pointed out that the joining processes of different materials is typically carried out on small-sized semi-finished products, such as plates of the order of magnitude of a glasses frame. That prevents from obtaining scale economies in processing speed, which may instead be achieved if there was a wide-surface sheet in which to automatically cut a plurality of identical imprints.

Finally, it must be considered that the different processes and compositions which originate the two different-pattern materials significantly characterise the semi-finished products, and can hence determine also a behaviour differentiated in time (shrinkages, colour changes, surface appearance, . . . ), which makes progressively manifest in an undesirable way the different nature of the various components.

Similar problems occur in sheet obtained by lamination of several layers of different colours.

It would hence be desirable to be able to offer a process for obtaining thermoplastic sheets of consistent material which is as homogeneous as possible, wherein at least two different patterns or aesthetic effects are defined, perfectly distinguishable from each other but joined not by clear dividing lines but rather by blurred areas.

SUMMARY OF THE INVENTION

The problem at the bottom of the invention is hence that of providing a process for manufacturing a sheet of thermoplastic material on which at least two distinguishable patterned areas mutually joined by a blurred area (soft intersection) are found, which is geometrically defined in position.

According to another aspect, it is intended to supply a product of such process, in the shape of a sheet, which may be used as semi-finished product for products without further assembling and/or gluing processing.

These objects are achieved through the process and the relative product as defined, in their essential terms, in the independent claims herewith attached.

Other inventive aspects of the invention are described in the dependent claims.

BRIEF DESCRIPTION OF THE DRAWINGS

Further features and advantages of the process and of the product according to the invention will in any case be more evident from the following detailed description of a preferred embodiment of the same, given as an example and illustrated in the attached drawings, wherein.

DETAILED DESCRIPTION OF THE PREFERRED EMBODIMENTS OF THE INVENTION

Figure 1:
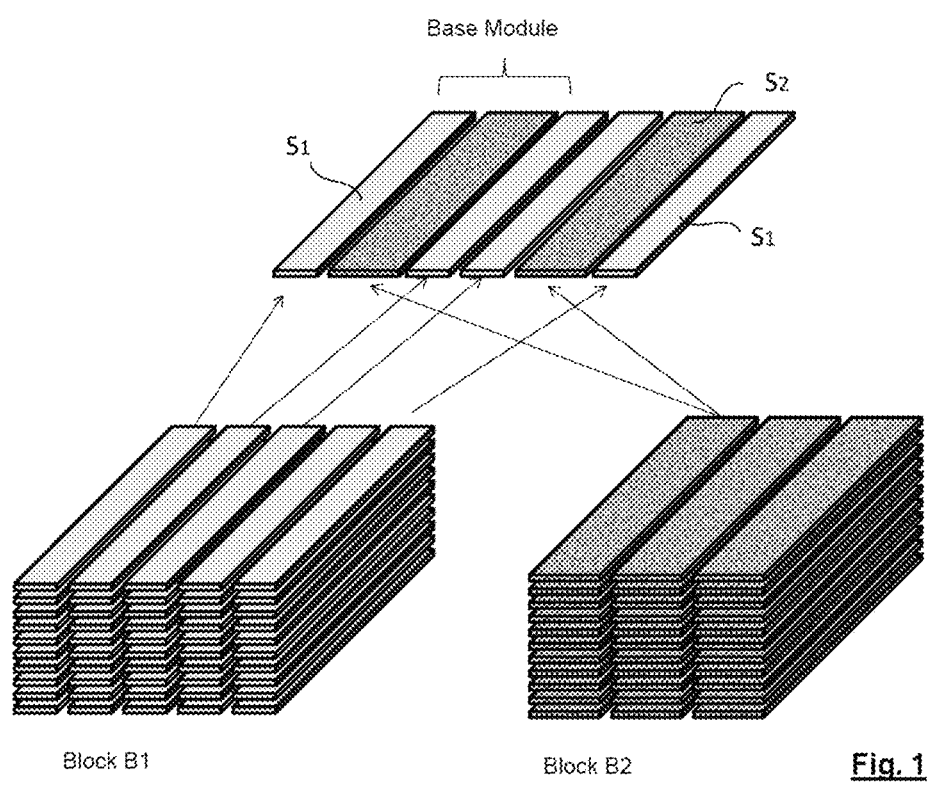
FIG. 1 is a perspective exemplifying view of a process step according to a first embodiment of the invention.

A semi-finished product of thermoplastic material in the shape of a planar sheet (typically with a thickness ranging from 0.15 mm to 3 cm) is obtained from a (wet or dry) block with an initial step of the process known per se.

In particular, at least two primary planar sheets of thermoplastic material L1-Ln are initially manufactured, with a homogeneous pattern or aesthetic appearance, but differing from each other. The sheets may be initially manufactured with any method known per se, such as extrusion, co-extrusion, injection, co-injection, from wet block (that is, with a low-boiling solvent in a percentage up to 30%) or from dry block, and so on.

Each sheet has a homogeneous pattern, which may consist of a plain colour (for example "light honey" hue) or of a predetermined geometric layout (for example, a so-called "Havana" chequered pattern, obtained through the process described in EP267409, but also of other types of pattern obtained by the mixing of granules, filaments, fragments, small spheres, dice, small cylinders, . . . ).

According to a peculiar feature of the invention, the two or more primary sheets are manufactured having a different concentration of dominating colouring, for example the concentration of colouring C1 in the single-colour sheet L1 is smaller than the concentration of colouring C2 in the diced sheet L2, in turn smaller than the concentration of colouring C3 in the diced sheet L3, that is, $C3>C2>C1\geq 0$.

In this context, by "dominating colouring" it is not intended the one which dominates merely in terms of quantity, but rather the colouring which "characterises the pattern", normally because it is darker, in the general aesthetic appearance of the material, with respect to the colour of the remaining mixture of material which is aesthetically perceived as matrix colour or basic colour. In a typical mixture of dice of two different colours (as described in EP267409), for obtaining a homogeneous, "Havana"-style material, there is a certain amount (for example 80%) of light-coloured dice with a certain amount and type of colouring (for example honey hue) wherein another amount of darker dice (for example charged with brown colouring) is embedded (the other 20%): these last ones determine the dominating colouring in the block, the concentration of which defines the aesthetic feature of that specific block of material.

In substance, with respect to a colouring which forms the basis/matrix of the sheet, the dominating colouring is the one which defines and characterises the pattern of the semi-finished product of thermoplastic material.

Moreover, at least the dominating colouring must be a migrating pigment/colouring, that is, an unstable pigment/colouring which hence has as peculiarity that of diffusing into the material in which it is mixed in the conditions of block melting (regardless of whether it is a dry or wet process), typically at temperatures in the order of 50-270° C. and at pressures in the order of 0.5-4 MPa.

Should this preliminary step be conducted with a wet-block method, as known the primary sheets L1-Ln are obtained by cutting slices from the two or more blocks B1-Bn, so as to obtain a plurality of sheets with a thickness in the order of 0.5-25 mm, through cutting methods known per se.

According to the invention, the plurality of primary sheets L1-Ln—individually or in group—are further cut, according to a plane perpendicular to the major surface of the sheet, forming a corresponding plurality of strips S1-Sn, of a length equal to that of the dimension of the block they derive from and of a width of a dimension useful for the subsequent step of the process, typically in a potential range from 15 mm to 60 mm, depending on the application. According to a peculiar aspect of the invention, in particular, the width of the strips is a submultiple—but not below ⅕, preferably ⅓—of a characteristic dimension of the finished product which one intends to obtain. In particular, if one considers as finished product the frontpiece of a glasses frame, a characteristic dimension may be the height thereof, that is, about 20-100 mm—and hence strips S1-Sn have a width in the order of 10-50 mm—or the width thereof, that is about 100-130 mm—and hence strips S1-Sn are of a width in the order of 20-50 mm.

The strips S1-Sn, each one having a homogeneous pattern, have different patterns each other, exactly as the corresponding primary sheets L1-Ln they are cut from.

The operation of cutting into strips may occur according to rectilinear lines (with a classic straight blade) or according to more complex cutting lines, for example slightly undulated, saw-toothed ones, comb-like, and so on.

Alternatively, the strips S1-Sn may be obtained by directly cutting a continuous strip coming out of an extrusion machine, such continuous strips performing the function of the primary sheets L1-Ln indicated above.

Subsequently, according to a first embodiment, at least two (but even three or more) different types of strips S1-Sn are mounted mutually adjacent (with the respective longitudinal axes parallel) in a workform, defining a base module (of a width in the order of magnitude of the characteristic dimension of the finished piece to be obtained) which may possibly be repeated several times (always arranging the strips side by side) until covering the entire width of the workform (FIG. 1).

In this context, it should be understood that "width" is the dimension which is transversal to the longest (longitudinal) dimension, while the characteristic dimension of the finished product is the dimension along which it is crossed the desired blurred area between the at least two distinguishable patterned areas.

The various strips or bands which make up the base module may be geometrically identical, but could also have different profile and dimensions. Furthermore, two side-by-side base modules could have a strip (S1-Sn) in common, which is hence conceived with twice a width with respect to what is necessary for a single module, so that one half thereof belongs to a base module and the other half belongs to the adjacent base module.

According to this first embodiment, once a first layer of the base module (consisting of at least two adjacent different strips S1-Sn), or of side-by-side multiple base modules, has been laid, an identical layer of the same base module is placed on top (or of the same base modules laid side by side to each other), equally oriented and arranged with respect to the workform, and so on until the desired number of layers to reach a desired height.

In this context, by the term workform the containment frame is understood which is commonly used in manufacturing blocks of thermoplastic material (typically cellulose acetate) through pressure and heat.

Once the workform has been filled with a plurality of overlapping layers of the base module, up to the desired height, the thus obtained layered body divided into strips undergoes pressure and heat of an extent typical of the forming processes from (wet or dry) block, for example 0.9 MPa and 170° C. for a time of about 20 minutes in the case of dry blocks.

During this compression and heating step the various strips and layers of thermoplastic material bond with each other, originating a compact block. At the same time (but partly also during the final step of any drying in the oven, where provided), the migrating colouring/pigment, unstable by definition, tends to migrate, in particular from the portion with greater concentration of the dominating colouring, towards the portions with lesser (or no) concentration of the dominating colouring; that determines a visual effect of migration from the strips having a greater amount of dominating colouring towards those having a smaller concentration of dominating colouring, in particular in correspondence of a restricted border area between the respective strips, thus determining a blurred colour hue in the contact area between one strip and the other, that is, along the cutting line by which the various mutually differing strips S1-Sn have been obtained.

Regardless from the physical phenomenon which generates it (osmosis, pigment dragging by the solvent, viscous flow in the plastic material in the fluid state, and so on), pigment/colouring migration produces a bleeding/blurring effect which is aesthetically desirable (although in other applications it can be considered a flaw index of the colouring) between one strip and the other.

At the end of the melting/maturing, that is, when the material has fully hardened and compacted in the block, said block is removed from the workform and then cut again into final sheets (with processes known per se) according to a plane parallel to the major surface of original strips S1-Sn.

A plurality of final sheets are thus obtained—possibly to undergo full drying again, if they are derived from primary sheets obtained from a wet block—which have an aesthetic appearance corresponding to that of the one or more base modules arranged side by side, where, however, the separation line between the various different-pattern strips S1-Sn has the desired blurred colour hue.

Figure 2:
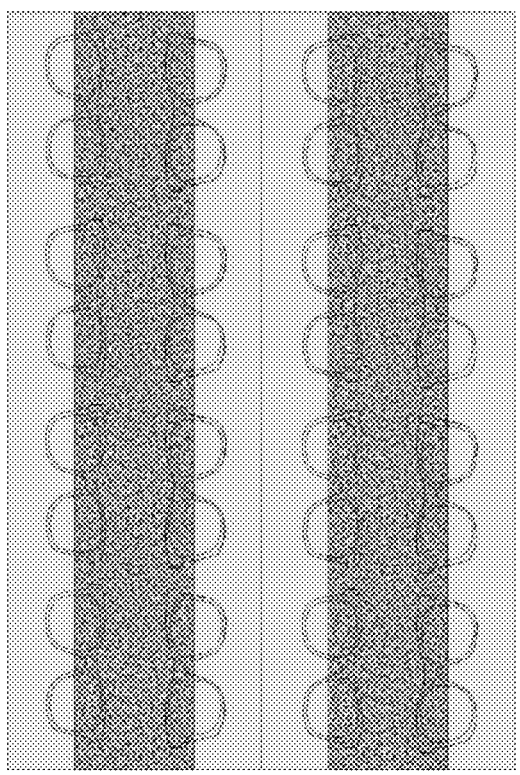
FIG. 2 is a top plan view of an exemplifying semi-finished product according to the invention wherein the imprint of the finished product is shown.

These final sheets according to the invention, which have an aesthetic appearance with ample strips S1-Sn of different patterns/colours, possibly repeated in a modular shape, make up the semi-finished product from which the final desired product can be cut out. In particular, from a two-strip base module, the frontpiece of a glasses frame can be cut out, which is located on the sheet with the width thereof in the longitudinal direction of the strips (FIG. 2), so as to have a pattern/colouring in the upper part of the frontpiece and a different pattern/colouring in the lower part of the frontpiece with a smooth transition/blurred area between them. Alternatively, the frontpieces may also be located on the sheet rotated by 90°, that is, with the width thereof in a direction crosswise to the strips (not shown).

When the final sheet has a surface pattern or appearance consisting of a plurality of base modules side by side, a corresponding plurality of roughly-shaped files may be carved for the final products (for example frontpieces of eyeglasses).

According to an alternative embodiment, it is provided to employ strips S1'-Sn' of large thickness (above 35 mm), substantially equal to the desired height of the body in the workform. In this case it is hence not necessary to overlap many layers of base module, but one (or little more) is sufficient. According to this variant, strips S1'-Sn' typically take up the appearance of small blocks or loaves. Such loaves may be obtained still directly by extrusion or by cutting very thick sheets (so much so as to take up, at the limit, the appearance of a block), similarly to the thin strips S1-Sn which are obtained from the thin originating sheets L1-Ln of the preceding embodiment.

Alternatively, according to a preferred embodiment of the invention, the strips S1'-Sn' in the shape of loaves are obtained each from the side by side arrangement of a plurality of identical sub-strips St1'-Stn', obtained from thin strips which are rotated by 90° (exposing on the surface of the strip S1'-Sn' the lateral edge or the front edge of the thin primary sheet from which the single sub-strips are obtained) and mutually arranged "packwise". In this case, the width of loaves S1'-Sn' is determined by the number of thin strips mutually arranged side by side "packwise" and defines the width of the strips which will then be evident in the final semi-finished product, while the width or the length of sub-strips St1'-Stn' (by definition, of low thickness), being rotated by 90° on the side or on the front, respectively, defines the height of loaves S1'-Sn'.

This embodiment has an advantageous stability with respect to the first embodiment described. As a matter of fact, during the step of arranging the loaves S1'-Sn' (solid or consisting of a plurality of sub-strips St1'-Stn') side by side, in the laying into the workform—since they are continuous in the direction of height—it is possible to impart and maintain a slight lateral compacting pressure force, which tends to preserve the composition and alignment in the base module; thereby the risk is avoided that the different loaves S1'-Sn' may undesirably slide one with respect to the other in the pressing step at high pressure in the workform. Vice versa, the lateral compacting pressure is not applicable in the case of the first embodiment seen above, since the various layers of overlapped thin strips would tend to warp or disassemble applying a lateral pressure.

According to a further embodiment of the invention, the strips S1-Sn to be arranged side by side and layered in the base module in the workform, may be obtained, instead of from a planar sheet (extruded or cut off a block), from irregular sheets, with a shaped or irregularly formed greater surface.

For example, it can be assumed to obtain an initial irregular sheet with an even pattern, proceeding with a process such as the one described in EP 267409 and then heating and applying a minimal pressure, useful for causing simply to mutually consolidate the single base members of the mixture, but not sufficient for defining an evenly molten and planar sheet. These raw or precompressed sheets/loaves may hence be used as they are in the final consolidation process in a workform, with no need for a previous cut or slicing.

As can be evinced from the above-reported description, the invention process allows to perfectly achieve the objects set forth in the premises. As a matter of fact, a semi-finished product is supplied in the form of a sheet, from which to be able to engrave the roughly-shaped blanks of the finished products, which has one or more base modules configured according to strips or bands of a different pattern/colour in which the (rectilinear or differently shaped) separation line between one strip and the other has a blurred colour hue, which is advantageously desired by the market.

The process is more flexible compared to the other extrusion or joining processes of multiple sheets, moreover achieving a much more appealing aesthetic effect and devoid of flaws.

However, it is understood that the invention must not be considered limited to the particular arrangement illustrated above, which represents only an exemplifying embodiment thereof, but that different variants are possible, all within the reach of a person skilled in the field, without departing from the scope of protection of the invention, as defined by the following claims.

For example, although only embodiments have been shown in which the bleeding colour is intimately mixed in the material making up the base members, it can be assumed that the bleeding colour is instead embedded in the material in another way.

The invention claimed is:

1. A manufacturing process of a semi-finished product of thermoplastic material, such as cellulose acetate, for obtaining products with aesthetic patterns which can be perceived in semi-transparency also in depth, comprising the mixing and the consolidation, through pressure and heat, of base particulate members having different dominating colouring, comprising the steps of
producing at least two initial elements of a thermoplastic material with even aesthetic patterns which are different each other and characterised in that furthermore said even aesthetic patterns of the at least two initial elements (L1-Ln; S1'-Sn') of thermoplastic material have a different concentration of the dominating colouring of a bleeding type in the specific thermoplastic material,
said two initial elements (L1-Ln; S1'-Sn') are shaped into strips or loaves (S1-Sn; S1'-Sn') of a submultiple width, not below ⅕, of a characteristic dimension of a finished product to be obtained,
at least two of said strips or loaves (S1-Sn; S1'-Sn') having different concentration of the dominating colouring are then inserted into a workform, arranging them side by side according to a side-by-side arrangement direction, defining at least one layer of base module having a width of the order of magnitude of a characteristic dimension of the finished product to be obtained,
said at least one layer of base module in the workform then undergoing pressure and heat to allow the melting and consolidation of the thermoplastic material in a single body, at the same time causing the migration of the dominating colouring at least from the strips or loaves (S1-Sn; S1'-Sn') with the greater concentration of the dominating colouring towards those with a lesser concentration of the dominating colouring, thus determining a blurred colour hue in the boundary areas between the different strips or loaves (S1-Sn; S1'-Sn'), and
finally cutting said single body of thermoplastic material into terminal sheets according to a plane parallel to said direction of side-by-side arrangement between said strips or loaves (S1-Sn; S1'-Sn').

2. The process as claimed in claim 1, wherein said at least two initial thermoplastic elements (L1-Ln) are thin sheets which are further cut, individually or in a group, according to a plane perpendicular to the greater surface thereof, into said plurality of strips (S1-Sn).

3. The process as claimed in claim 2, wherein to said layer of at least one base module a plurality of identical layers of the same base module are overlapped, equally oriented and arranged with respect to the workform, until reaching a pre-set height.

4. The process as claimed in claim 2, wherein said base module is repeated multiple times, laterally arranging side by side said strips or loaves (S1-Sn; S1'-Sn') until covering the entire extension of said workform.

5. The process as claimed in claim 2, wherein said strips or loaves (S1-Sn; S1'-Sn') are obtained by complex cutting lines, such as undulated, sawtooth or comb lines.

6. The process as claimed in claim 2, wherein said strips or loaves (S1-Sn; S1'-Sn') which make up said base module have different profiles and/or dimensions.

7. The process as claimed in claim 1, wherein each of said at least two initial elements in the shape of loaves (S1'-Sn') consist of a plurality of sub-strips (S1t'-Stn') obtained from planar sheets, rotated by 90° and mutually packed, said sub-strips (S1t'-Stn') being of a width equal to the height of said loaves (S1'-Sn').

8. The process as claimed in claim 1, wherein said base module is repeated multiple times, laterally arranging side by side said strips or loaves (S1-Sn; S1'-Sn') until covering the entire extension of said workform.

9. The process as claimed in claim 1, wherein said strips or loaves (S1-Sn; S1'-Sn') are obtained by complex cutting lines, such as undulated, sawtooth or comb lines.

10. The process as claimed in claim 1, wherein said strips or loaves (S1-Sn; S1'-Sn') which make up said base module have different profiles and/or dimensions.

11. The process as claimed in claim 1, wherein said two initial elements (L1-Ln; S1'-Sn') are shaped into strips or loaves (S1-Sn; S1'-Sn') of a submultiple width, not below ⅓, of a characteristic dimension of a finished product to be obtained.

\* \* \* \* \*